US009508059B2

(12) United States Patent
Ligh et al.

(10) Patent No.: US 9,508,059 B2
(45) Date of Patent: Nov. 29, 2016

(54) MESSAGING DEVICE HAVING A GRAPHICAL USER INTERFACE FOR INITIATING COMMUNICATION TO RECIPIENTS

(75) Inventors: Ming Ligh, Seattle, WA (US); Paulo S. T. Chow, North Bend, WA (US); Valerie Goulart, Bellevue, WA (US); Anthony Giardini, Bellevue, WA (US); Georgiana Gormley, Durham, NC (US); Jeff Gough, Bellevue, WA (US); Patrick Carney, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 1260 days.

(21) Appl. No.: 12/133,329

(22) Filed: Jun. 4, 2008

(65) Prior Publication Data
US 2009/0271712 A1 Oct. 29, 2009

Related U.S. Application Data

(63) Continuation of application No. PCT/US2008/061585, filed on Apr. 25, 2008.

(51) Int. Cl.
*G06F 3/048* (2013.01)
*G06Q 10/10* (2012.01)
*H04M 1/725* (2006.01)
*H04M 1/2745* (2006.01)

(52) U.S. Cl.
CPC ........ *G06Q 10/107* (2013.01); *H04M 1/27455* (2013.01); *H04M 1/72547* (2013.01); *H04M 1/274508* (2013.01); *H04M 1/72552* (2013.01); *H04M 2250/22* (2013.01)

(58) Field of Classification Search
CPC ..... H04L 29/06; G06F 3/048; G06F 3/0484; G06F 3/0482; G06F 3/04883; G06F 3/0488; G06F 9/542; G06Q 10/10
USPC .................................................. 715/751–760
See application file for complete search history.

(56) References Cited

U.S. PATENT DOCUMENTS 5,579,472 A * 11/1996 Keyworth et al. ............ 715/751
5,973,692 A    10/1999 Knowlton et al.
6,333,973 B1 * 12/2001 Smith .................... H04M 1/576
                                                            379/67.1
6,430,604 B1    8/2002 Ogle et al.
(Continued)

OTHER PUBLICATIONS

International Search Report and Written Opinion for PCT/US2009/041733; Applicant: T-Mobile USA, Inc.; Mailing Date: Jun. 16, 2009, 9 pages.
(Continued)

*Primary Examiner* — Tadeese Hailu
(74) *Attorney, Agent, or Firm* — Perkins Coie LLP

(57) ABSTRACT

A messaging device allows a user to initiate communication to recipients via a graphical user interface. In some embodiments, messages are composed by a user via a touchscreen display. Pre-existing messages may also be retrieved by the user via the display. Icons representing potential message recipients are displayed, and the user may deliver a message to a recipient by associating the message with the icon that represents the desired recipient, such as by a drag-and-drop or pop-and-hop motion. In addition, the user may indicate to which of the recipient's various electronic devices or services the message is to be delivered. In some embodiments, the user may deliver the message to a group of recipients.

20 Claims, 7 Drawing Sheets

(56) References Cited

U.S. PATENT DOCUMENTS

| | | | |
|---|---|---|---|
| 6,490,614 B1 | 12/2002 | Shaffer et al. | |
| 6,546,005 B1* | 4/2003 | Berkley et al. | 370/353 |
| 6,608,637 B1* | 8/2003 | Beaton et al. | 715/762 |
| 6,654,790 B2 | 11/2003 | Ogle et al. | |
| 7,003,308 B1* | 2/2006 | Fuoss et al. | 455/466 |
| 7,007,085 B1* | 2/2006 | Malik | 709/224 |
| 7,035,923 B1 | 4/2006 | Yoakum et al. | |
| 7,076,533 B1 | 7/2006 | Knox et al. | |
| 7,363,345 B2 | 4/2008 | Austin-Lane et al. | |
| 7,428,580 B2 | 9/2008 | Hullfish et al. | |
| 7,680,892 B2 | 3/2010 | Knox et al. | |
| 7,783,592 B2* | 8/2010 | Armstrong et al. | |
| 8,214,749 B2* | 7/2012 | Feinberg | G06F 11/302 715/753 |
| 8,626,862 B2* | 1/2014 | Frank | H04L 12/581 379/93.23 |
| 8,771,102 B2* | 7/2014 | Beach et al. | 473/345 |
| 2002/0130904 A1* | 9/2002 | Becker et al. | 345/753 |
| 2003/0052915 A1 | 3/2003 | Brown et al. | |
| 2003/0163525 A1* | 8/2003 | Hendriks et al. | 709/204 |
| 2003/0172287 A1 | 9/2003 | Bailo et al. | |
| 2003/0210265 A1* | 11/2003 | Haimberg | 345/758 |
| 2003/0225846 A1* | 12/2003 | Heikes et al. | 709/207 |
| 2004/0148346 A1* | 7/2004 | Weaver et al. | 709/204 |
| 2005/0108329 A1* | 5/2005 | Weaver et al. | 709/204 |
| 2005/0166154 A1* | 7/2005 | Wilson | G06F 3/0481 715/751 |
| 2005/0169446 A1* | 8/2005 | Randall et al. | 379/93.23 |
| 2006/0010197 A1* | 1/2006 | Ovenden | 709/204 |
| 2006/0053379 A1* | 3/2006 | Henderson et al. | 715/751 |
| 2006/0075044 A1 | 4/2006 | Fox et al. | |
| 2006/0148527 A1* | 7/2006 | Blount | 455/566 |
| 2006/0149816 A1* | 7/2006 | Cadiz et al. | 709/206 |
| 2006/0168037 A1 | 7/2006 | Audu et al. | |
| 2006/0168049 A1 | 7/2006 | Orozco et al. | |
| 2006/0170669 A1* | 8/2006 | Walker et al. | 345/418 |
| 2006/0285441 A1* | 12/2006 | Walker et al. | 368/10 |
| 2007/0005714 A1* | 1/2007 | LeVasseur et al. | 709/206 |
| 2007/0036301 A1* | 2/2007 | Voticky et al. | 379/88.22 |
| 2007/0112915 A1 | 5/2007 | Klassen et al. | |
| 2007/0168863 A1* | 7/2007 | Blattner et al. | |
| 2007/0281676 A1 | 12/2007 | Borras et al. | |
| 2008/0040436 A1 | 2/2008 | Setlur et al. | |
| 2008/0055263 A1 | 3/2008 | Lemay et al. | |
| 2008/0153459 A1 | 6/2008 | Kansal et al. | |
| 2008/0163075 A1* | 7/2008 | Beck | H04L 12/585 715/759 |
| 2008/0222257 A1* | 9/2008 | Mukherjee et al. | 709/206 |
| 2008/0222295 A1* | 9/2008 | Robinson et al. | 709/227 |
| 2008/0222710 A1* | 9/2008 | Blagsvedt et al. | 726/7 |
| 2008/0231635 A1* | 9/2008 | Saund | 345/440 |
| 2008/0309617 A1* | 12/2008 | Kong et al. | 345/157 |
| 2009/0019376 A1* | 1/2009 | Quillen et al. | 715/753 |
| 2009/0117942 A1 | 5/2009 | Boningue et al. | |
| 2009/0119678 A1* | 5/2009 | Shih et al. | 719/313 |
| 2009/0170480 A1* | 7/2009 | Lee | 455/414.1 |
| 2009/0181702 A1* | 7/2009 | Vargas et al. | 455/466 |
| 2009/0217180 A1 | 8/2009 | Tovino et al. | |
| 2009/0249244 A1* | 10/2009 | Robinson et al. | 715/781 |
| 2009/0256808 A1* | 10/2009 | Kun et al. | 345/173 |
| 2009/0259959 A1* | 10/2009 | Grotjohn et al. | 715/769 |
| 2009/0271486 A1 | 10/2009 | Ligh et al. | |
| 2009/0285129 A1* | 11/2009 | Swanburg et al. | 370/259 |
| 2009/0286558 A1* | 11/2009 | Zufi et al. | 455/466 |
| 2010/0005138 A1 | 1/2010 | Manzano | |
| 2010/0218119 A1 | 8/2010 | Scott | |
| 2011/0078271 A1 | 3/2011 | Ito et al. | |
| 2011/0106620 A1 | 5/2011 | Setiawan et al. | |

OTHER PUBLICATIONS

"OpenPeak Closes $30 Million Series C Funding." OpenPeak Software & Device Solutions. Nov. 14, 2007. [Retrieved May 16, 2008]. Retrieved from the Internet: <http://openpeak.com/Press_Funding.php>.

"Verizon Unveils Next-Generation 'FiOS FONE' Home Communications Center for FiOS Customers." OpenPeak Software & Device Solutions. Aug. 1, 2007. [Retrieved May 16, 2008]. Retrieved from the Internet: <http://www.openpeak.com/Press_Fios_Fone.php>.

Keating, Tom. "Cool Phone for FiOS, Uverse and other VoIP providers." VoIP & Gadgets Blog. 2008. [Retrieved on May 16, 2008]. Retrieved from the Internet: <http://blog.tmcnet.com/blog/tom-keating/triple-play/cool-phones-for-fios-uverse-and-other-voip-providers.asp>.

Pages from OpenPeak Software & Device Solutions, 21 pages. [Retrieved on May 16, 2008]. Retrieved from the Internet: <http://www.openpeak.com/>.

Segan, Sascha. "The iPhone of Home Phones." PCMAG.com. Aug. 1, 2008. [Retrieved on May 16, 2008]. Retrieved from the Internet < <http://www.pcmag.com/article2/0,2817,2246158,00.asp>.

Tingle, Andrew. "OpenPeak OpenFrame Touch Screen Home SmartPhone Offering VoIP, Internet & Multimedia Functionality." Technology, Gadgets and Curiosities: From cutting edge, to over the edge to the truly bizarre. 2008. [Retrieved on May 16, 2008]. Retrieved from the Internet: <http://nexus404.com/Blog/2008/03/15/openpeak-openframe-touch-screen-home-smartphone-voip-internet-multimedia-functionality/>.

International Search Report and Written Opinion for Application No. PCT/US2008/61585; Applicant: T-Mobile USA, Inc.; Date of Mailing: Sep. 10, 2008, 11 pages.

* cited by examiner

| Recipient identifier | Recipient icon | Recipient addresses | | Preferred delivery methods | | Group membership |
|---|---|---|---|---|---|---|
| Mom | mom.bmp | phone | (200) 555-1212 | 1 | phone | Family |
| | | email | Mom@hotmail.com | 2 | email | Parents |
| | | digital picture frame | 192.168.0.2 | 3 | eBoard | |
| | | eBoard | 192.168.0.4 | | | |
| Dad | golfer.png | phone | (200) 555-1214 | 1 | SMS | Family |
| | | SMS | (200) 555-1214 | 2 | phone | Parents |
| | | email | Dadlovesgolf@gmail.com | 3 | email | |
| | | eBoard | 192.168.0.4 | | | |
| John | johnkarate.bmp | phone | (200) 555-1216 | 1 | SMS | Family |
| | | SMS | (200) 555-1216 | 2 | phone | Kids |
| | | IM | JohnJohn | 3 | IM | |
| | | eBoard | 192.168.0.4 | | | |
| Kate | kate12.bmp | phone | (200) 555-1218 | 1 | phone | Family |
| | | SMS | (200) 555-1218 | 2 | SMS | Kids |
| | | email | SoccerKate@gmail.com | 3 | IM | Kate's Soccer Team |
| | | IM | SoccerKate | 4 | email | |
| | | eBoard | 192.168.0.4 | | | |

Figure 5

MESSAGING DEVICE HAVING A GRAPHICAL USER INTERFACE FOR INITIATING COMMUNICATION TO RECIPIENTS

CROSS-REFERENCE TO RELATED APPLICATION(S)

This application is a continuation of International Application No. PCT/US08/61585 entitled MESSAGING DEVICE HAVING A GRAPHICAL USER INTERFACE FOR INITIATING COMMUNICATION TO RECIPIENTS, filed Apr. 25, 2008.

BACKGROUND

Traditionally, people leave handwritten notes for family members, friends, co-workers, and others in "can't miss" places to ensure that their messages are received. For example, paper messages may be pinned on bulletin boards, post-it notes may be attached to computers or chairs, notes may be left on counters, etc. As people's lives become increasingly busy, however, it can be challenging to communicate constant changes in plans and schedules, as the traditional handwritten note is not very effective for communicating promptly with others. Some of the shortcomings associated with physical messages may be overcome by the use of electronic messages. Electronic messages have the advantage of being quickly delivered to a user. Determining how to send a message to users, however, is becoming an increasingly challenging problem. Each user to whom a message is addressed may have several electronic devices, including a mobile phone, one or more computers, a personal digital assistant (PDA), and other devices. In addition, each user may have access to various electronic services via their electronic devices, including voice and text messaging, email, instant messaging, and other services. With so many devices and communication services, it can be difficult to coordinate communication with family members, friends, co-workers, and others. The need therefore exists for a system that overcomes the above limitations, in addition to providing other benefits.

BRIEF DESCRIPTION OF THE DRAWINGS

FIG. 5 is a block diagram of a representative data structure for storing recipient identifiers, icons, addresses, and other information associated with recipients.

DETAILED DESCRIPTION

A hardware and/or software facility for initiating communication to recipients via a graphical user interface is described. The facility may be incorporated in an electronic messaging device (referred to herein as an "eBoard") having a touchscreen display and centrally located in a high-traffic location where it may be used by several individuals such as family members, friends, or business associates to communicate and to stay coordinated. Messages are composed by a user via the touchscreen display or an attached data entry device of the eBoard. Icons representing potential message recipients are displayed, and the user may deliver a message to a recipient by associating the message with an icon that represents the desired recipient. Such association may take place by a "drag-and-drop" motion, a "pop-and-hop" motion, or another association command. The user may be presented with one or more interfaces to allow the user to specify additional details about the delivery of the message. For example, the user may indicate to which of the recipient's various electronic devices the message is to be delivered, which of the recipient's various messaging services should be used to deliver the message, and the timing of the message delivery.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Figure 1:
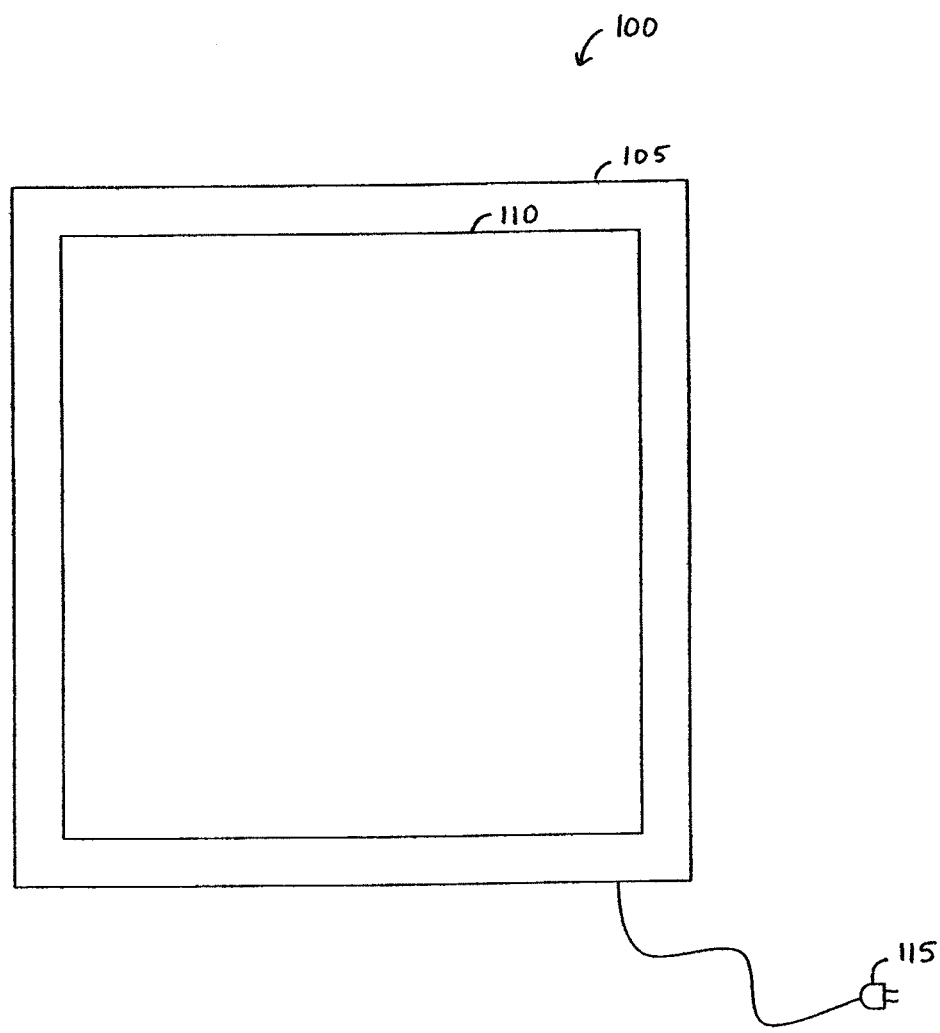
FIG. 1 is a block diagram of a representative device having a graphical user interface for initiating communication to recipients.

FIG. 1 is a block diagram illustrating a representative eBoard 100 in which the facility may be incorporated. eBoard 100 includes a touchscreen display 110 that may be bordered by a frame 105. The touchscreen display can detect the location of touches on the display using any of a variety of touchscreen technologies, such as resistive, capacitive, infrared, surface acoustic waves, strain gauge, optical imaging, acoustic pulse recognition, dispersive signal or other technology. A touchscreen display 110 allows a user to directly interact with the content of the display, without the need for a keyboard, mouse, or other input device. For example, a user may touch the display 110 with a stylus, finger, or other implement in order to input content on the display, select items on the display, modify the content of the display, and take other user actions associated with the content depicted on the display. An attached data entry device, such as a keyboard, mouse, microphone, webcam or other input device may optionally be connected (wired or wirelessly) in order to interact with the eBoard 100. For example, the eBoard may be accessed by a remote or satellite device connected to the eBoard via 801.11 or "Wi-Fi," Bluetooth, or similar connection, by which the satellite messaging device accesses the eBoard's functionality remotely. The eBoard 100 may also include a plug 115 that connects the eBoard 100 to a power source. The eBoard may be mounted on a surface where it can be accessed by several individuals. For example, the eBoard may be mounted in a kitchen for use by family members, in a conference room for use by a team of employees, in a dormitory for use by student residents, etc. While a vertical mounting is depicted in the figures, it will be appreciated that the eBoard may be horizontally mounted or mounted at an angle to facilitate use of the eBoard.

Figure 2:
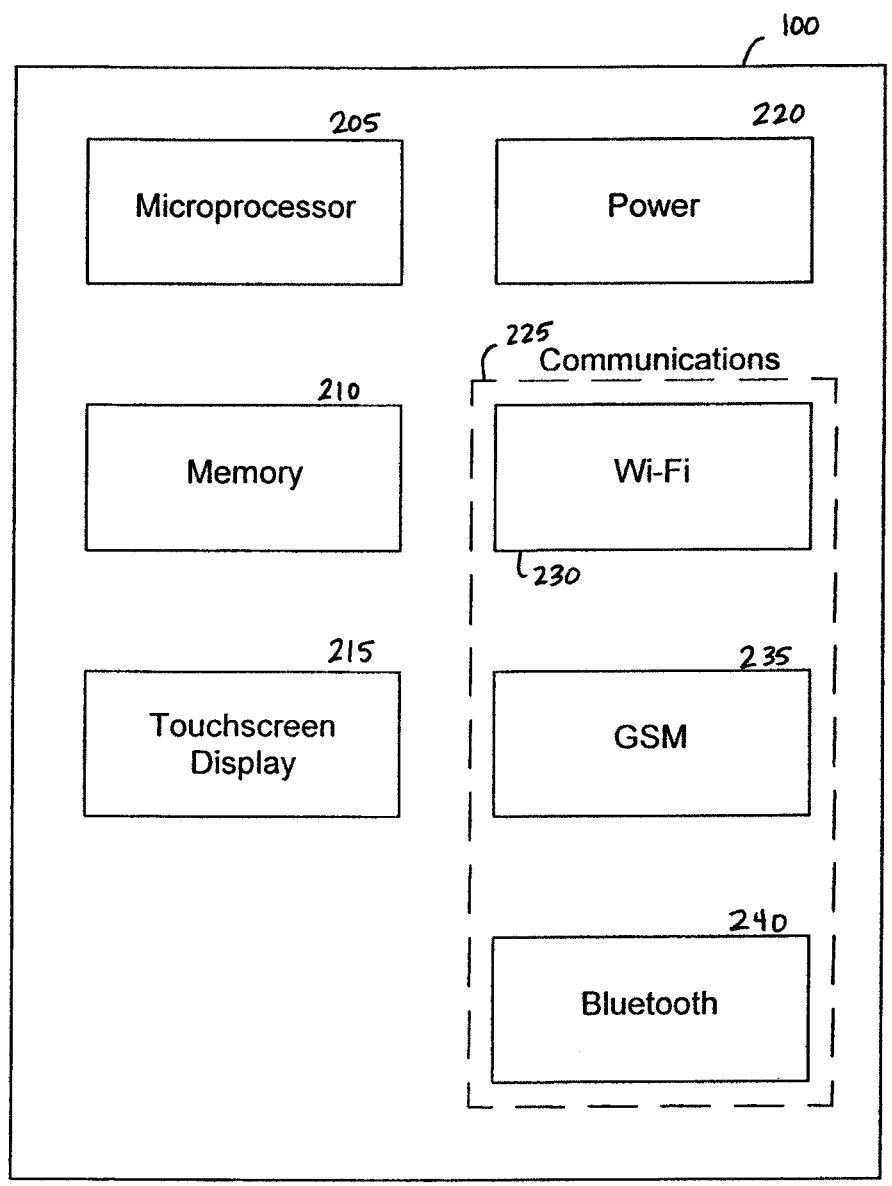
FIG. 2 is a block diagram of representative components of a device having a graphical user interface for initiating communication to recipients.

FIG. 2 is a block diagram illustrating representative components of the eBoard 100 that may incorporate the disclosed facility. eBoard 100 may include a microprocessor 205, a memory component 210, a touchscreen display 215, a power component 220, and various communications components 225. Memory component 210 may be a magnetic media drive, optical media drive, other non-volatile memory, flash memory, and so on, capable of storing operational software and messages including text, audio, video, images, and other types of media. Power component 220 provides power to the eBoard 100 and the components of the eBoard. Communications components 225 may include a Wi-Fi component 230 for wireless electronic communication, a GSM component 235 for mobile phone communication, and a Bluetooth component 240 for short range wireless communication. Communications components 225 may also include wired communication, such as a USB or firewire connection, other forms of wireless communication such as GPRS, EDGE, or UMTS, and so on. eBoard 100 may also include other components not specifically described herein.

Figure 3:
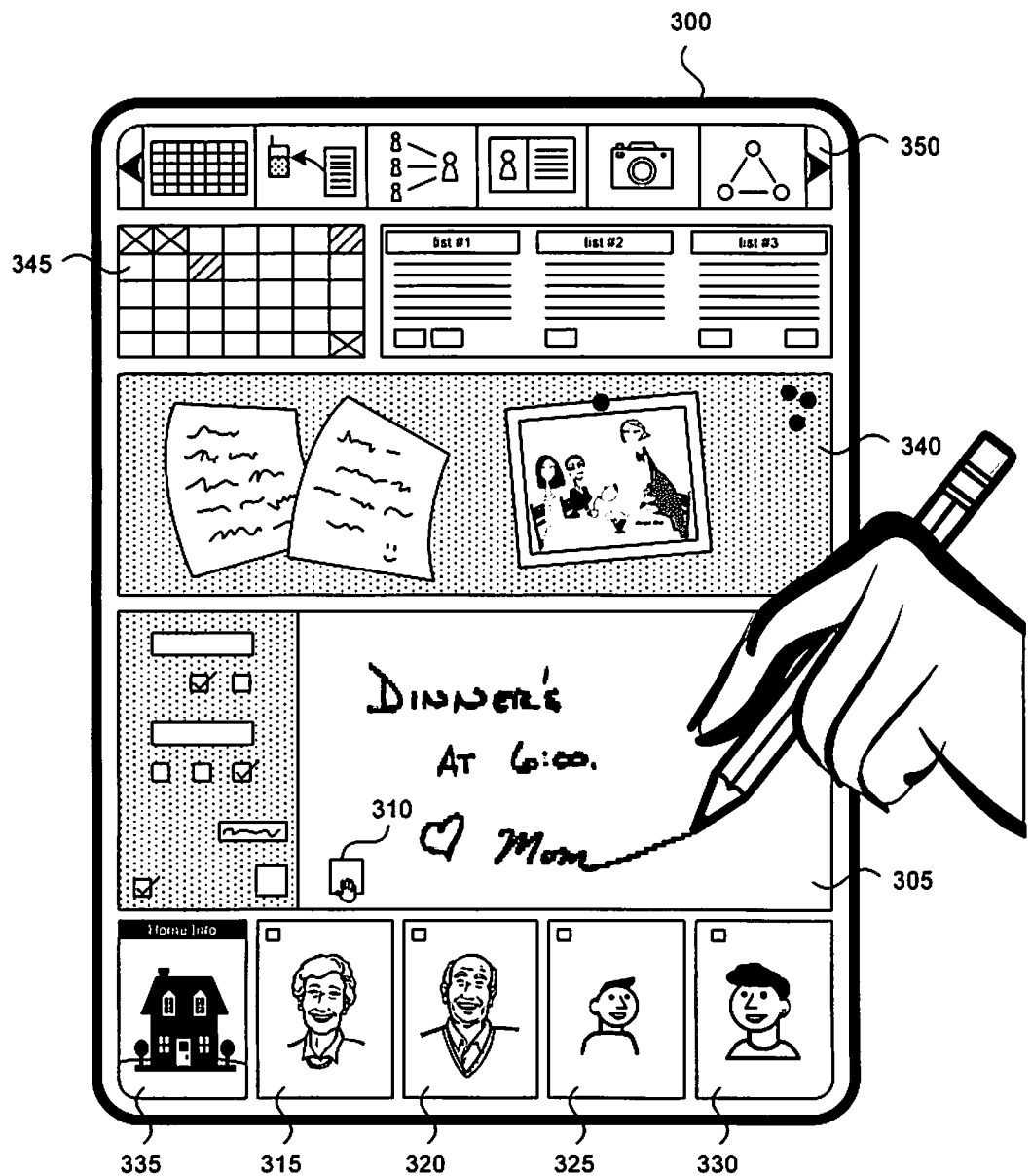
FIG. 3 is a representative screenshot of a graphical user interface for initiating communication to recipients.

FIG. 3 is a representative screenshot of a graphical user interface 300 generated by the facility for initiating communication to recipients. As will be described in additional detail herein, the interface may be used for composing and sending electronic messages to one or more recipients, such as the recipients identified by icons 315, 320, 325, 330, and 335. The interface may contain various features, including an electronic message composition area 305, a bulletin board 340, a calendar 345, a menu 350 for accessing applications and files, and other features. The interface generated by the facility may be used for a variety of functions in addition to allowing a user to write and deliver electronic messages, such as allowing a user to maintain a calendar, display digital photographs, pay bills, access applications and files, and other functions.

Figure 4:
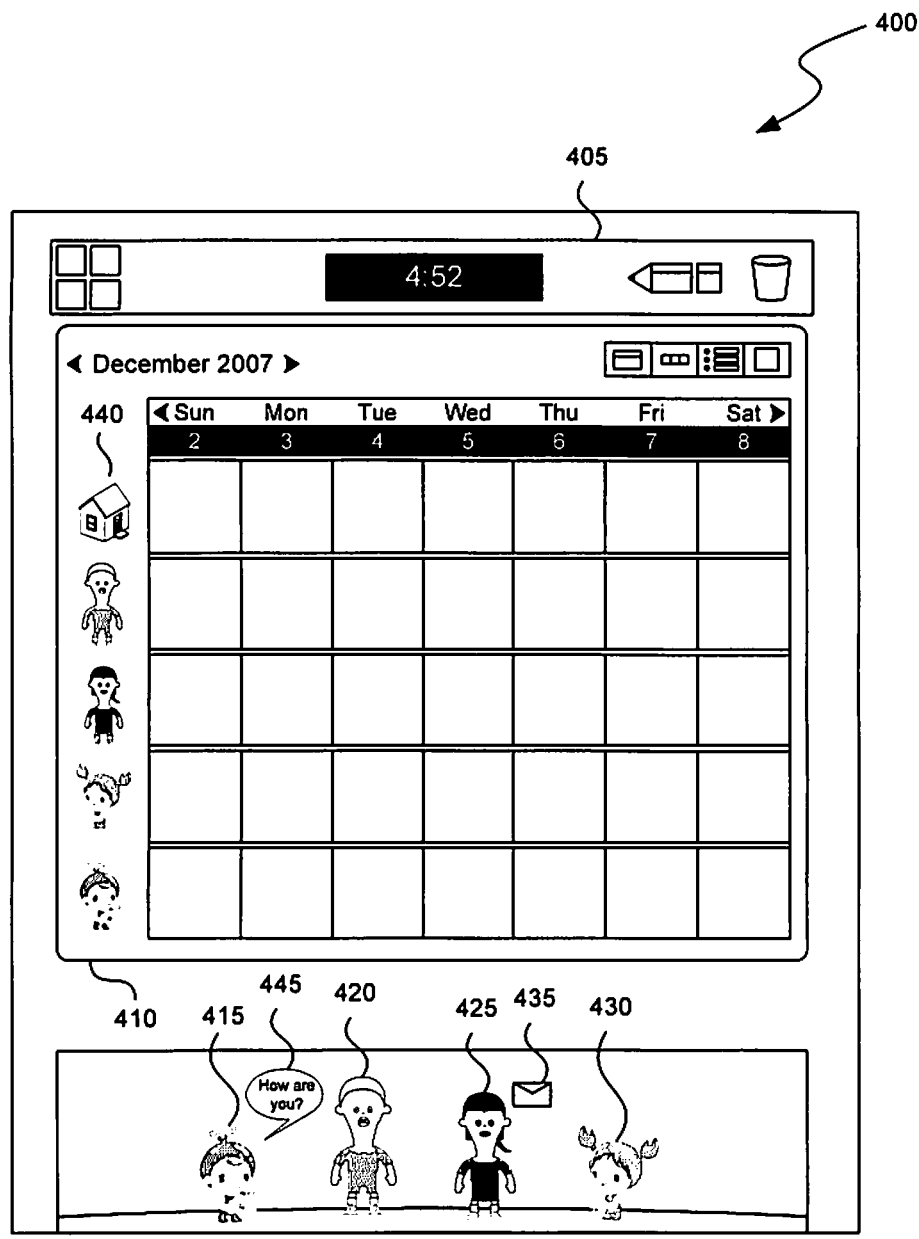
FIG. 4 is a representative screenshot of an alternative graphical user interface for initiating communication to recipients.

FIG. 4 is a representative screenshot of an alternative graphical user interface 400 generated by the facility for initiating communication to recipients. The interface 400 contains recipient icons 415, 420, 425, and 430. The interface 400 also includes a calendar, which may include entries for each recipient identified by the recipient icons 415, 420, 425, and 430, in addition to entries for the entire family. The family may be represented by a group icon 440. In addition, the interface 400 includes a menu 405 by which messages may be composed and other features may be accessed by the user.

In some embodiments, the facility allows a user to configure the graphical user interface by specifying commonly used or potential message recipients that should be depicted in the interface. Such message recipients may include, for example, the user's family members, friends, co-workers, the user him- or herself, and other recipients. Message recipients may also include one or more devices capable of receiving communications, such as a digital picture frame or a satellite messaging device, regardless of the identity of the person(s) who own and/or use such devices. In some embodiments, each recipient added by the user is identified on the interface by an icon, photograph, or other graphic (hereinafter collectively referred to as "icons"). FIG. 3 shows four individual recipient icons 315, 320, 325, and 330 that have added to the interface 300. For example, icon 315 may represent Dad, icon 320 may represent Mom, icon 325 may represent their son, John, and icon 330 may represent their daughter, Kate. FIG. 3 also shows one group recipient icon 335 that has been added to the interface. The group recipient icon may represent a group of recipients, such as all of the displayed family members.

In some embodiments, when the facility is provided with one or more recipients to display in the interface, the facility may allow the user to select an icon that represents each recipient. The icon may be selected from a library of icons provided by the facility, an on-line repository or an on-line retail location, from digital photos from the user's digital photo album, from an electronic drawing created by the user via the graphical user interface, or in another manner. Alternatively or additionally, each recipient may pre-define an icon that identifies him- or herself, the icon being selected by the recipient from the same or different sources as are used by a user to select an icon. If an identifying icon has been pre-defined by a recipient, the user may be required to use the pre-defined icon, or the user may assign another icon to represent the recipient. If no icon is selected by the user or pre-defined by a recipient, the facility may assign a default icon for the recipient.

The facility stores recipient identifiers and icons, in addition to other information associated with recipients, in an appropriate data structure. FIG. 5 is a block diagram illustrating a representative data structure 500 that may be used by the facility to store recipient identifiers, icons, addresses, and other information associated with recipients. Data structure 500 may reside in device memory 210, may be stored at a location remote from the device 100, or may be stored in another manner. The data structure contains a unique identifier for each recipient that is depicted on the interface. A recipient identifier may be a name, nickname, identification number, or other identifier associated with the recipient. For example, column 505 of FIG. 5 depicts recipient identifiers "Mom," "Dad," "John," and "Kate"—i.e., names associated with each of the recipients. In addition, the data structure may contain indications of icons that identify each of the recipients on the interface. Icons may be referenced by file names, pointers, identification numbers, or in another manner. For example, column 510 of FIG. 5 depicts icon file names associated with each of the recipients, including "mom.bmp" associated with Mom and "golfer.png" associated with Dad.

For each recipient that is added by a user, the user may provide to the facility one or more addresses that may be used to establish communication with that recipient. Recipient addresses may include email addresses to establish email communication, instant messaging addresses to establish IM communication, phone numbers to establish voice or data communication, IP addresses to establish device communication, and any other address that would allow the user to communicate with the recipient. In some embodiments, once a recipient has been identified by the user to the facility, the recipient may be allowed access by the facility to update the stored address information. For example, a recipient may be able to send a new email address to the facility or may be able to modify an existing phone number that is stored by the facility.

Once provided, recipient addresses are stored by the facility in an appropriate data structure. For example, recipient addresses may be stored along with recipient identifiers and icons in data structure 500 described above. Recipient addresses may also be stored by the facility in a separate data structure. Column 515 of FIG. 5 illustrates representative recipient addresses that may be stored by the facility. For example, row 530 depicts four addresses associated with Mom—a phone number, an email address, an IP address for a digital picture frame, and an IP address for an eBoard. In addition, row 535 depicts four addresses associated with Dad—a phone number assigned to both voice ("phone") and text ("SMS") communications, an email address, and an IP address for the eBoard shared with Mom and the rest of the family. One skilled in the art will appreciate that each recipient may have a different number of associated addresses, that multiple addresses may be associated with the same method of communication (e.g., a recipient may have two or more email addresses), and that addresses associated with recipients may vary in other ways.

In addition to recipient identifiers, icons, and addresses, the facility may store other information associated with recipients in an appropriate data structure. This information may include recipients' preferred delivery methods and group membership. For example, data structure 500 contains preferred delivery methods in column 520 and group membership in column 525. As will be described in additional detail herein, each recipient can indicate his or her preferred methods of delivery. For example, row 530 of FIG. 5 illustrates that Mom has indicated that she prefers to be contacted first by phone, then by email, and finally by leaving messages on the eBoard. As will also be described in additional detail herein, each recipient may be part of one or more groups of recipients. For example, row 545 of FIG. 5 indicates that Kate is part of three groups—"Family," "Kids," and "Kate's Soccer Team." While FIG. 5 depicts a table whose contents and organization are designed to make it more comprehensible to the reader, those skilled in the art will appreciate that the actual data structure used by the facility to store this information may differ from the table shown. For example, the data structure may be organized in a different manner, may contain more or less information than shown, may be compressed and/or encrypted, and may otherwise be optimized in a variety of ways.

Once the user has configured the interface by adding potential message recipients to the interface and providing addresses that may be used to establish communication with the recipients, the facility allows messages to be composed by a user via the interface. A message composed by the user may include any type of electronic communication, including a voice message, picture message, video message, a typed or (electronically) handwritten note, a drawing, a calendar event, and other types of electronic communications. For example, the user may use a stylus, finger, or other implement to generate a handwritten note on a message area 305 of the interface 300. This message area 305 may resemble a whiteboard, chalkboard, notepad, or other surface for receiving a note. As another example, the facility may permit the user to record a voice message via the graphical user interface. This message may be sent to a recipient as a voice message, or the facility may transcribe the voice message and send the transcription to a recipient, such as via email or SMS message. Representative software for performing the conversion may be a product like Dragon NaturallySpeaking by Nuance Communications. In some embodiments, pre-existing messages—such as an email message, video, audio file, or other electronic communication stored by or available to the facility—may be retrieved by the user via the graphical user interface. For example, applications and files may be accessible to the user via a menu 350 on the interface 300.

The facility determines which user has composed the message and/or initiated delivery of the message. The user may manually indicate his or her identity using text entry, selection of an identity from a menu, selection of an icon representing the user, etc. Alternatively, the facility may automatically identify the user in a variety of ways, including fingerprint recognition, voice recognition, handwriting recognition, optical character recognition (OCR), a camera associated with the interface, and in other ways. The determination of which user has composed or initiated delivery of (or will compose or initiate delivery of) a message may be determined before, during, or after the message has been composed or delivery has been initiated. By identifying the user, the facility may notify the recipient who is the sender of the message. For example, the facility may populate a "From:" field in an email or SMS message with the user's name or other identifier.

Once a message has been composed by the user, the user uses the touchscreen display to associate the message with one or more intended recipients. One technique for associating the message with recipient(s) is for the user to drag-and-drop the message onto the icon(s) of the desired recipient(s) or onto the contact name(s) or address(es) of the recipient(s) in an address book or contact list. The dragging-and-dropping of a message may be accomplished through any of a variety of methods, including touching the message with one or more styluses, fingers, or other implements, pulling the message to its intended location(s) via the implement(s), and releasing the implement(s). For example, if Mom has composed a message 305 to Dad, Mom may touch the message 305 with a stylus, drag the message 305 onto Dad's icon 315 using the stylus, and release the stylus. Another technique for associating the message with recipient(s) is a "pop-and-hop" motion in which the user taps the message once, multiple times, or in a pattern, and then taps the desired recipient(s) once, multiple times, or in a pattern. Again, the "pop-and-hop" association of message and recipient(s) may be accomplished via one or more styluses, fingers, or other implements.

In some embodiments, the user may initiate association of a message with a recipient by touching an implement anywhere on the message 305, while in other embodiments the user may initiate association of a message with a recipient by touching a particular portion of the message 305. For example, a particular portion of the message 305, such as icon 310, may activate the association, while other portions of the message 305 are inactive for initiating association. In some embodiments, when the user is engaged in associating a message with a recipient, once the dragging or successive tapping motion touches, or is within the vicinity of, a recipient's icon, the facility may display an indication that this recipient is the active selection. For example, the facility may highlight or enlarge the recipient's icon, or otherwise indicate that if the user releases the dragging or tapping motion that the message will be delivered to the active recipient.

In some embodiments, once the user has indicated that a message is to be delivered to one or more recipients, the facility automatically transmits the message to the recipient (s) using a default delivery option. The facility may allow the user to specify the default delivery option when initially storing information about the recipient. Alternatively, the facility may automatically send the message using the last-used delivery option to that recipient absent some indication from the user to change the delivery option.

In some embodiments, once the user has indicated that a message is to be delivered to one or more recipients, the facility presents the user with a variety of delivery options for the message. These delivery options may include various devices associated with the recipient(s), such as phone, picture frame, eBoard, an "eFrame," a satellite messaging device, and other devices. Delivery options may also include various services utilized by the recipient(s), such as email, SMS messaging, MMS messaging, instant messaging, and other services. The facility may determine which delivery options are suitable for a given message based on the addresses associated with the intended message recipient in an appropriate data structure, such as data structure 500 described above in reference to FIG. 5. For example, if the user has specified that a message is to be delivered to Dad, row 535 of FIG. 5 indicates that appropriate delivery options include phone, SMS, email, and eBoard.

Figure 6:
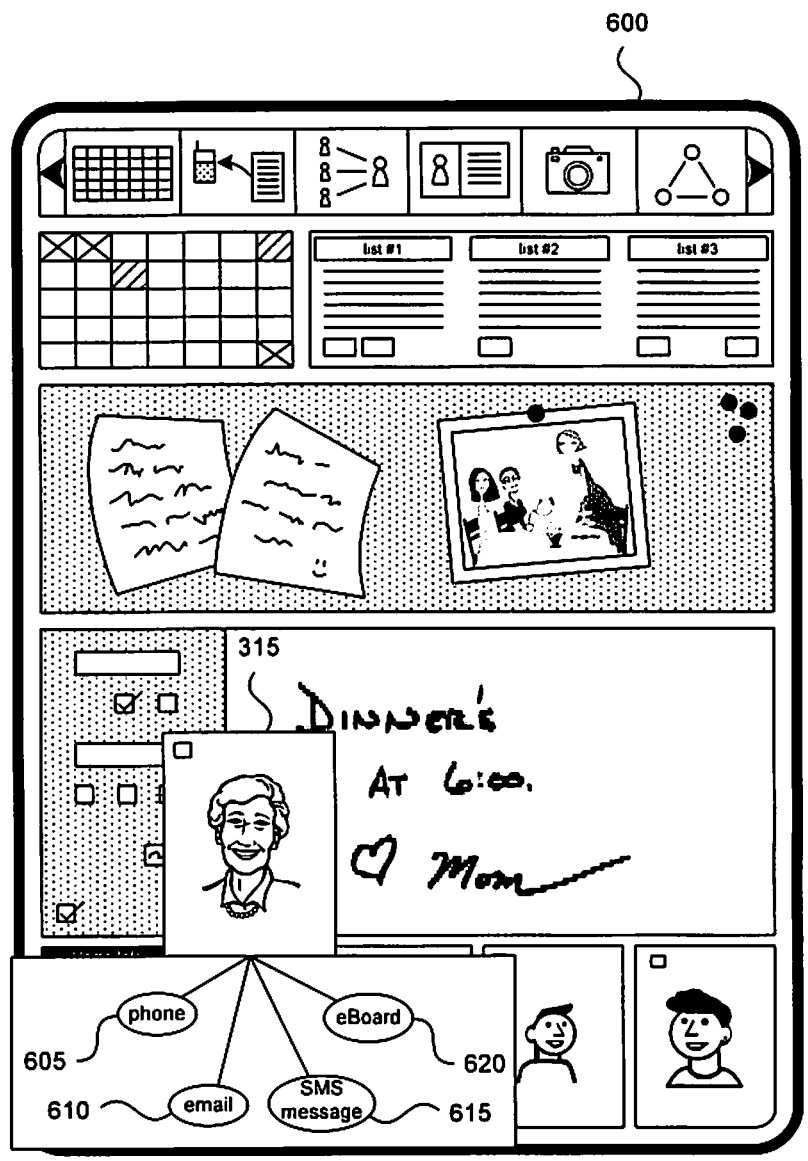
FIG. 6 is a representative screenshot depicting various delivery options that may be presented for delivery of a message.

Once the facility determines suitable delivery options for a message, these options are presented to the user. FIG. 6 is a representative screenshot of an interface 600 that the facility may use to present delivery options. For example, when Mom associates a message with Dad's icon 315, Mom may be presented with options including "phone" 605, "email" 610, "SMS message" 615, "eBoard" 620, and other options. Mom can select the method by which she would like the message to be delivered. For example, if Mom knows that Dad is commuting home, and is not at the office, Mom may decide to deliver the message to Dad via an SMS message 615.

In some embodiments, messages may also be delivered to one or more recipients directly via the interface. For example, one of the delivery options associated with a recipient may be "eBoard," which may correspond to the messaging device shared by the recipient and the user, or which may correspond to a messaging device owned by the recipient. For example, before bed, Mom may compose a message for her son, John, that reads "Don't forget your soccer uniform!" Mom may associate the message with John's icon and select the "eBoard" delivery method. The next morning, before John leaves for school, he can check the eBoard to see if he has any messages. Similarly, if a satellite messaging device is associated with John, he can check the satellite messaging device to see if he has any messages. In either embodiment, John can read Mom's note and make sure he has his soccer uniform.

The facility may present the delivery options to the user before, during, or after a message has been associated with a recipient. For example, after a user has associated a message with a recipient's icon, the facility may provide delivery options to the user. The user may select one of the presented delivery options, such as by touching the option with a stylus or other implement. Alternatively, the facility may present the delivery options while the user is associating the message, before the user has finally associated the message with the recipient's icon. For example, in a "drag-and-drop" embodiment, once the user has dragged a message such that it is touching or within the vicinity of the recipient's icon, the facility may present the delivery options to the user. The user may select a delivery option by dropping the message onto the desired delivery option. Returning to FIG. 6 and the example above, Mom may drag a message onto Dad's icon 315, be presented with the available delivery options 605, 610, 615, and 620, and drop the message onto an "SMS message" delivery option 615. If no delivery option is selected by the user, the facility may select a default delivery method as previously described.

The delivery options presented by the facility, and thus available for selection by the user, may vary dynamically. In some embodiments, the delivery options associated with each recipient vary based on the delivery preferences of the respective recipients. Each recipient may predefine those methods by which messages may be delivered to the recipient. For example, if a recipient has an email account but does not check it very often, the recipient may not permit messages to be delivered via email. Alternatively or additionally, each recipient may rank delivery options for the facility in order of preference. For example, a recipient may indicate that he prefers to be contacted first by phone, next by SMS message, and finally by email. Recipients' delivery preferences may be stored by the facility in an appropriate data structure, such as data structure 500 described above in reference to FIG. 5. Column 520 of FIG. 5 contains recipients' preferred delivery methods. For example, row 530 of FIG. 5 indicates that Mom prefers to be contacted first by phone, then by email, and finally by leaving messages on the eBoard. A recipient need not rank as a preferred delivery method each of the addresses that have been provided to the facility. For example, the recipient who does not check his email often may provide an email address to the facility, but may not rank it as a preferred delivery method.

The facility may communicate recipients' delivery preferences to the user, such as by presenting the delivery options to the user in the order in which they have been ranked by the recipient. In the example above, the facility may present the delivery options for the recipient in a vertical list, with "phone" listed first, "SMS message" listed second, and "email" listed third. The facility may also communicate recipients' delivery preferences by numbering, color-coding, or otherwise highlighting the preferred delivery options.

The delivery options presented by the facility may also vary dynamically based on other factors, such as availability information associated with the respective recipients and type of message to be delivered. For example, the facility may display a visual indication of the current activity status of a recipient on one or more of a recipient's devices. Returning to FIG. 4, a grayed-out icon 430 may indicate that the recipient identified by the icon 430 is not currently active on any of that recipient's devices. Alternatively or additionally, the facility may only present delivery options associated with devices on which a recipient is currently active. As another example, if a recipient's phone does not support images, the facility may not provide "phone" as an option for delivery of a message that includes a photo, but may provide "phone" as an option for delivery of a message that is only text.

In some embodiments, once a delivery option has been selected by the user, the facility presents the user with additional selections regarding the time and/or urgency of delivery. Selections for delivery time may include "urgent," "now," and "later." If a user indicates that a message is urgent, the facility may mark the message accordingly upon delivery to the recipient. For example, a voicemail message may be designated as urgent, or an email may be marked as a high priority. Alternatively, the user may set a message to be delivered to a recipient at a later time. For example, a user may wish to have a message delivered at a particular time, such as an hour before an appointment, to remind the recipient about the appointment. As another example, a user may wish to have a message delivered on a particular date, such as a recipient's birthday. Alternatively, the user may set a message to be delivered now, and the facility will deliver the message to the recipient presently.

Figure 7:
FIG. 7 is a representative screenshot depicting delivery of a message to a group of recipients.

In some cases, a user may wish to deliver a message to multiple recipients at once. For example, Mom may want to remind the entire family about dinner time. FIG. 7 is a representative screenshot of an interface 700 depicting delivery of a message to multiple recipients. In some embodiments, to send a message to multiple recipients a user may simultaneously associate the message with the desired recipients, such as by a drag-and-drop or pop-and-hop motion to the desired recipients. In other embodiments, to send a message to multiple recipients a user may first indicate the recipients to whom the message is to be delivered, such as by drawing a circle 705 around the desired recipients' icons 315 and 320 with a stylus or other implement. In some embodiments, the circle 705 drawn by the user is displayed on the interface 700. Alternatively or additionally, when the user draws a circle around a group of recipients, the facility may display an indication that the circled recipients are the active selection. For example, the facility may highlight, enlarge, or tag the icons of the circled recipients, or may otherwise indicate that the recipients are the active selection. Once a group of recipients has been circled, the user may associate the message with the circle 705 to deliver the message to all of the circled recipients. For example, in a drag-and-drop embodiment, if John wants to send a message to Mom and Dad reminding them about the school play, John can compose a message 710, draw a circle 705 around Mom and Dad's icons 315 and 320, and drag the message 710 to the circled area. In some embodiments, the circle 705 may disappear after the message 710 has been associated with the circle 705. Alternatively or additionally, any displayed indication of the active selection of the group, such as highlighting, enlargement, or tagging of the recipients' icons, may disappear after the message has been associated with the group of recipients.

Alternatively or additionally, to send a message to multiple recipients at once, the facility may allow the user to create an icon that represents a group of recipients. Like an individual recipient, each group may be represented on the interface by an icon, photograph, or other graphic. For example, a user's family may be represented by a house icon, a digital photograph of the user's family, or another icon. Returning to FIG. 3, icon 335 may represent a group, such as the user's family. Alternatively or additionally, group icons may be distinguishable from icons that are associated with individual recipients. For example, group icons may have a particular shape, such as a box, bucket, envelope, or other icon.

In some embodiments, once a group icon has been selected, the user may associate recipients with the group icon in order to define or populate the group. For example, a user may select a box labeled "Family" as an icon to represent his family, and may associate each of his family members' icons with the "Family" box. (Note that, unless so indicated by the user, associating a recipient with a group does not remove the recipient's individual icon from the interface; it simply adds the recipient to a group.) Returning to FIG. 3, Mom may set up a family group by associating icons 315, 320, 325, and 330—via a "drag-and-drop" motion, a "pop-and-hop" motion, or similar touchscreen-enabled interface—with the group icon 335.

The facility may store indications of the groups of which each recipient is a member in an appropriate data structure, such as data structure 500 described above in reference to FIG. 5. Column 525 of FIG. 5 illustrates indications of group membership. For example, once Mom has established the family group described above, the facility may associate the "Family" group with each of Mom, Dad, John, and Kate. In addition, FIG. 5 depicts a "Parents" group comprising Mom and Dad and a "Kids" group comprising John and Kate. Groups may also contain recipients not depicted as individual recipients on the eBoard. For example, Mom may be the "team mom" for Kate's soccer team and may need to send messages periodically to all members of the team. Mom may set up a "Kate's Soccer Team" group, which may include Kate (as indicated in row 545 of FIG. 5) and Kate's teammates, who are not otherwise represented on the eBoard. A group that includes recipients not individually represented on the eBoard may be defined by a user in a number of ways, such as by accessing a menu option, preference, or setting associated with the group.

In some embodiments, after recipients have been added to the group, the user may associate messages with the group icon to deliver the messages to each of the members of the group. For example, Mom may associate message 305 with the group icon 335. One skilled in the art will appreciate that these steps may be performed in an order that is different than the order described. For example, a user may first associate messages with a group icon and then associate the recipients with the group icon. As another example, the user may alternately associate messages and recipients with the group icon. Each message associated with the group icon will be delivered to each of the recipients in the group.

In some embodiments, groups established via a group icon may reside on the interface until the user indicates that the group is to be removed or deleted. This may be useful, for example, when the user expects to make use of the same group of recipients on a repeated basis. For example, a group of recipients that may be used often is the user's family. Alternatively or additionally, groups established via a group icon may reside on the interface for a limited duration or event, and may disappear without the user affirmatively indicating that the group should be removed or deleted. This may be useful, for example, when the user wants to set up a group of a few friends to receive a particular message. In some embodiments, a group may disappear after it is used by the user to deliver a particular message. Alternatively or additionally, a group may be removed from the interface once it has remained unused for a certain period of time, such as a week, a month, or another period of time.

In some embodiments, messages are delivered to all members of a group by the same delivery method. The facility may display to the user only those delivery options that are shared among the group members. For example, Mom may have a mobile phone, email, and a digital picture frame; and Dad may have a mobile phone, email, and SMS messaging. When John sends a message to a group comprising Mom and Dad, John may be presented with delivery options that include "phone" and "email." Alternatively or additionally, messages may be delivered to each member of a group by a delivery method specific to the recipient and/or the devices associated with the recipient. For example, if John wants to send a digital photograph to both Mom and Dad, John may send the photograph to Mom's digital picture frame, but to Dad's email. That is, if John prefers to have the photo displayed by a digital picture frame, he can choose that method of delivery for those users who have such a device; for other users, he can choose an alternate method of delivery, such as email.

The presence of a message may be indicated to a recipient in a variety of ways. In some embodiments, when a recipient has messages waiting, the facility may display a message icon in association with the recipient's icon. For example, an envelope, asterisk, star, or other icon may indicate the presence of a message. In addition, the facility may indicate the number of messages that are waiting for the recipient. For example, returning to FIG. 4, icon 435 may indicate that the recipient 425 has four messages waiting. In some embodiments, message icons, numbers of messages waiting, and other indicators that a recipient has messages waiting may indicate the presence and number of messages waiting for the recipient on all of the recipient's devices. In other embodiments, these indicators may indicate only the presence and number of messages that have been delivered to the recipient by the eBoard delivery option (i.e., to be viewed on the eBoard). In addition, if a recipient has an urgent message waiting, the facility may display an additional icon, such as an exclamation point, asterisk, or another icon, in addition to the message waiting icon. Alternatively or additionally, the presence of an urgent message may be indicated by a message waiting icon that is displayed in a different color, bolded, or in another manner. Alternatively or additionally, the facility may present an indication that a transmitted message has been read by the recipient. One skilled in the art will appreciate that message indicators may indicate the presence and attributes of messages in other manners.

One skilled in the art will appreciate that the steps described above may be performed in an order other than the order described. For example, in some embodiments, the user may begin a communication with a recipient by first selecting the recipient to whom the message will be sent. Once the user has selected the recipient, the user may compose a message and select a delivery method as described above, and the facility will deliver the message to the selected recipient via the selected delivery method. In still other embodiments, the user may begin a communication with a recipient by first selecting the delivery method by which the message will be delivered. Once the delivery method has been selected, the user may compose a message and select a desired recipient as described above, and the facility will deliver the message to the selected recipient via the selected delivery method. In addition, messages may be composed and delivered in an order or manner other than those described herein.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

We claim:

1. A method of initiating communication to a recipient on an electronic messaging device, the method comprising:
   displaying, on a touchscreen of the electronic messaging device, a graphical user interface adapted to display two or more graphics and a composition area,
      wherein the at least two graphics are icons associated with at least two respective recipients,
      wherein the two or more graphics and the composition area are concurrently displayed on the touchscreen display, and
      wherein the composition area is adapted to receive handwriting;
   receiving, from the user on the touchscreen display in the composition area, a message,
      wherein the message is intended for a recipient or the message is intended to be posted on the graphical user interface;
   receiving, from the user on the touchscreen display, a motion,
      wherein the motion includes moving the message from the composition area to at least one icon associated with a respective recipient,
      wherein the motion is a drag-and-drop motion or a pop-and-hop motion;
   determining, on the electronic messaging device, a first delivery option for sending the message to the respective recipient;
   determining, on the electronic messaging device, a second delivery option for sending the message to the respective recipient,
      wherein the second delivery option is preferred by the respective recipient, and
      wherein the second delivery option is stored on the electronic messaging device in association with the respective recipient;
   displaying on the touchscreen the first and second delivery options,
      wherein the delivery options, the composition area, and the two icons are displaying concurrently;
   receiving, from the user, a selection to send the message via the first or second delivery option; and
   sending the message to the respective recipient via the selected delivery option.

2. The method of claim 1, wherein the receiving, from the user, the message for delivery to one of recipients further comprises:
   indicating, by the user, a selection of a pre-existing message to be delivered to a recipient; and
   retrieving the selected pre-existing message for delivery to the recipient.

3. The method of claim 1, wherein a recipient may be a group of recipients.

4. The method of claim 1, further comprising: determining a user of the electronic messaging device, wherein the electronic messaging device is accessible to a plurality of users.

5. The method of claim 4, further comprising capturing information that characterizes the user via fingerprint recognition, voice recognition, handwriting recognition, optical character recognition, or a camera.

6. The method of claim 1, wherein the user is included in the plurality of recipients, and wherein each recipient shares at least one delivery option.

7. The method of claim 6, wherein the shared at least one delivery option includes an electronic address of the electronic messaging device.

8. The method of claim 1, wherein the first delivery option is a default delivery option.

9. The method of claim 1, wherein the second delivery option includes an auxiliary delivery option in a list of preferred delivery options associated with the respective recipient, and wherein the list of preferred delivery options is stored on the electronic messaging device.

10. The method of claim 9, further comprising capturing information that characterizes the user via fingerprint recognition, voice recognition, handwriting recognition, optical character recognition, or a camera.

11. A system for sending messages to recipients via a touchscreen display, the system comprising:
   a display, at a touchscreen of an electronic messaging device, configured to display a graphical user interface including two or more icons associated with respective recipients and a composition area,
      wherein the two or more icons and the composition area are concurrently displayed on the touchscreen display;
      wherein the touchscreen is configured to receive handwriting;
   an input component configured to:
      receive, from the user in the composition area, a message for delivery; and
      receive, from the user, a motion,
         wherein the motion includes moving the message from the composition area to an icon associated with a respective recipient,
         wherein the motion is a drag-and-drop motion or a pop-and-hop motion;

receive, from the user, a selection of an icon associated with the respective recipient; and receive, from the user, a selection of a delivery option for the message;

a processing component configured to:
determine a first delivery option for sending the message to the respective recipient;
determine a second delivery option for sending the message to the respective recipient,
wherein the second delivery option is preferred by the recipient, and
wherein the second delivery option is stored on the electronic messaging device in association with the recipient, and
send the message to the respective recipient via the first or second delivery option.

12. The system of claim 11 wherein the drag-and-drop motion comprises:
detecting the touching of the message on the display with an implement,
detecting the dragging of the message to the selected icon associated with the intended recipient, and
detecting the release of the implement touching the message.

13. The system of claim 11 wherein the pop-and-hop motion comprises:
detecting the touching of the message on the display with an implement,
detecting the tapping of the message, and
detecting the subsequent tapping of the selected icon associated with the intended recipient.

14. The system of claim 11, wherein the input component is further utilized for determining a user of the electronic messaging device, wherein the electronic messaging device is accessible to a plurality of users.

15. A tangible computer-readable medium for executing a method for initiating communication to recipients via an electronic messaging device, the method comprising:
displaying, on a touchscreen of the electronic messaging device, a graphical user interface adapted to display two or more graphics and a composition area,
wherein at least two graphics are icons associated with at least two respective recipients, and
wherein the two or more graphics and the composition area are concurrently displayed on the touchscreen display, and
wherein the composition area is adapted to receive handwriting;
receiving from the user inputs on the touchscreen in the composition area;
wherein the inputs create a message for delivery;
determining a first delivery option for sending the message to the respective recipient;
determining, on the electronic messaging device, a second delivery option for sending the message to the respective recipient,
wherein the second delivery option is preferred by the respective recipient, and
wherein the second delivery option is stored on the electronic messaging device in association with the respective recipient, and
displaying on the touchscreen the first and second deliver options,
wherein the delivery options, the composition area, and the two icons are displaying concurrently;
receiving, from the user, a selection to send the message via the first or second delivery option; and
sending the message to the respective recipient via the second delivery option.

16. The tangible computer-readable medium of claim 15, further comprising:
displaying message delivery options, wherein the display of the message delivery options varies based on delivery preferences, availability information of the respective recipient, and type of message.

17. The tangible computer-readable medium of claim 15 wherein the method further comprises:
displaying a message graphic in association with the selected graphic, wherein the message graphic indicates that the respective recipient has a message waiting.

18. The tangible computer-readable medium of claim 15 wherein the method further comprises:
displaying a message graphic in association with the selected graphic, wherein the message graphic indicates that the respective recipient has opened a waiting message.

19. The tangible computer-readable medium of claim 15 wherein the method further comprises:
displaying to the user delivery time options associated with the respective recipient,
wherein the displayed delivery time options include urgent, now and later; and
detecting from the user a selection of a displayed delivery time option.

20. The tangible computer-readable medium of claim 15, further comprising capturing information that characterizes the user via fingerprint recognition, voice recognition, handwriting recognition, optical character recognition, or a camera.

* * * * *